United States Patent
Kwon

(10) Patent No.: US 8,180,528 B2
(45) Date of Patent: May 15, 2012

(54) APPARATUS AND METHOD FOR CONTROLLING WIPER AND WASHER

(75) Inventor: Mun Soon Kwon, Gyeonggi-do (KR)

(73) Assignee: Hyundai Autonet Co., Ltd., Yongin-Si (KR)

( * ) Notice: Subject to any disclaimer, the term of this patent is extended or adjusted under 35 U.S.C. 154(b) by 517 days.

(21) Appl. No.: 12/370,284

(22) Filed: Feb. 12, 2009

(65) Prior Publication Data

US 2009/0216402 A1 Aug. 27, 2009

(30) Foreign Application Priority Data

Feb. 21, 2008 (KR) .................. 10-2008-0015925

(51) Int. Cl.
*G06F 7/00* (2006.01)
(52) U.S. Cl. ........................................... 701/36
(58) Field of Classification Search .............. 701/38; 700/283
See application file for complete search history.

(56) References Cited

U.S. PATENT DOCUMENTS

| | | | |
|---|---|---|---|
| 6,281,649 B1 * | 8/2001 | Ouellette et al. | 318/443 |
| 7,309,970 B2 * | 12/2007 | Gao | 318/443 |
| 2004/0112981 A1 * | 6/2004 | Ivanov et al. | 239/128 |
| 2006/0127224 A1 * | 6/2006 | Sweet et al. | 417/32 |
| 2007/0015451 A1 * | 1/2007 | McGrath, Jr. | 454/75 |
| 2008/0173437 A1 * | 7/2008 | Yelles | 165/204 |

FOREIGN PATENT DOCUMENTS

| | | |
|---|---|---|
| JP | 1-108864 U | 7/1989 |
| KR | 1998-073683 A | 11/1998 |
| KR | 1998-083908 A | 12/1998 |
| KR | 10-2006-0008407 | 1/2006 |
| KR | 10-2006-0054770 | 5/2006 |

OTHER PUBLICATIONS

Office Action issued by the Korean Intellectual Property Office on Jul. 28, 2009, in counterpart Korean Patent Application No. 10-2008-0015925 (4 pages, in Korean).
Office Action issued by the Korean Intellectual Property Office on Nov. 9, 2009, in counterpart Korean Patent Application No. 10-2008-0015925 (3 pages, in Korean).

* cited by examiner

*Primary Examiner* — Faye M. Fleming
(74) *Attorney, Agent, or Firm* — NSIP Law

(57) ABSTRACT

Provided are an apparatus and a method for controlling a wiper and washer. An apparatus for controlling a wiper and washer, includes a wiper to wipe a windshield of a vehicle, a washer to eject washer fluid to the windshield of the vehicle, and an intelligent multi-function module (IMFM) to utilize a temperature sensing function of the vehicle according to a selected intelligent multi-function mode, and control the wiper and washer according to a sensed temperature with respect to the vehicle.

7 Claims, 2 Drawing Sheets

| SECTION | REMOTE CONTROLLER REMOTE CONTROL/ BUTTON DIRECT CONTROL | | | |
|---|---|---|---|---|
| | SERVICE MODE | | DRIVER MODE | |
| WARM WEATHER (REFERENCE TEMPERATURE OR MORE) | ◯ WIPER | ◯ WASHER | ☐ WIPER | ☐ WASHER |
| COLD (LESS THAN REFERENCE TEMPERATURE) | ◯ WIPER | △ WASHER | ☐ WIPER | ☐ WASHER |

◯ : OPERATION   ☐ : OPERATION ACCORDING TO SELELCTION OF USER   △ : NON-OPERATION

APPARATUS AND METHOD FOR CONTROLLING WIPER AND WASHER

CROSS-REFERENCE TO RELATED APPLICATION(S)

This application claims the benefit under 35 U.S.C. §119(a) of a Korean Patent Application No. 10-2008-0015925, filed on Feb. 21, 2008 in the Korean Intellectual Property Office, the disclosure of which is incorporated herein by reference in its entirety.

TECHNICAL FIELD

The following description relates to an apparatus and method for controlling a wiper and washer, and in particular, to an apparatus and a method for variously controlling a wiper and washer according to external environments and a requirement of a user.

BACKGROUND

Generally, a vehicle includes a wiper on a front windshield to wipe rain or snow or to wash the windshield. A vehicle may include a wiper control apparatus and a washer ejection apparatus to eliminate pollutants such as dust or oil that are gathered on the front windshield and obstruct the forward view of a driver. Such a washer ejection apparatus ejects washer fluid to the front windshield, and a wiper control apparatus eliminates the pollutants and the washer fluid using a wiper.

However, in a typical wiper and washer control apparatus, since a power supply voltage is not applied to a motor(s) related to the drive of the wiper/the washer when an ignition key is turned off during an operation of the wiper/the washer, the wiper/the washer may stop in the middle of the operation.

Since the wiper/the washer is simply driven with a switch, features are limited, and the washer and the like may cause noise due to the direct drive of the switch.

Moreover, since an input switch and a body control module (BCM) to control an output according to the input switch are separated, the resulting system may be inefficient in terms of cost.

SUMMARY

Accordingly, according to an aspect, there is provided an apparatus and a method for controlling a wiper and washer, in which the wiper and the washer are variously controlled according to the external environment or a requirement of a user/driver.

According to another aspect, there is provided an apparatus for controlling a wiper and washer, including a wiper to wipe a windshield of a vehicle, a washer to eject washer fluid to the windshield of the vehicle, and an intelligent multi-function module (IMFM) to utilize a temperature sensing function of the vehicle according to a selected intelligent multi-function mode, and control the wiper and washer according to a sensed temperature with respect to the vehicle.

The IMFM may include a wireless receiver to receive a wireless control signal for the wiper and washer, and a temperature sensor to sense a temperature with respect to the vehicle.

The IMFM may control a drive of the washer in view of the sensed temperature upon a service mode of the intelligent multi-function mode.

The IMFM may control the washer so as not to eject washer fluid in response to the sensed temperature being less than a reference temperature, and control the washer to eject the washer fluid in response to the sensed temperature being more than the reference temperature, in a service mode of the intelligent multi-function mode.

The reference temperature may be a predetermined temperature to control a drive of the washer lest the washer fluid is ejected and frozen. The reference temperature may be changeable by a user/driver.

A request for the intelligent multi-function mode may be made in a wireless fashion or in a wire fashion.

The IMFM may control the wiper and washer according to the sensed temperature in a service mode of the intelligent multi-function mode, and control the wiper and washer according to a requirement of a user/driver in a driver mode of the intelligent multi-function mode.

According to still another aspect, there is provided a method for controlling a wiper and washer, the method including determining a mode of an intelligent multi-function mode to control the wiper and washer, and controlling the wiper and washer in view of a temperature with respect to a vehicle according to the mode of the intelligent multi-function mode.

The mode of the intelligent multi-function mode to control the wiper and washer may include a service mode to control the wiper and washer according to the temperature with respect to the vehicle, and a driver mode to control the wiper and washer according to a requirement of a user/driver.

The controlling of the wiper and washer may include controlling the washer so as to not to eject washer fluid in response to the temperature being less than a reference temperature in a service mode of the intelligent multi-function mode, and controlling the washer to eject the washer fluid in response to the temperature being more than the reference temperature in the service mode of the intelligent multi-function mode.

Other features and aspects will be apparent from the following detailed description, the drawings, and the claims.

Figures 1, 2:
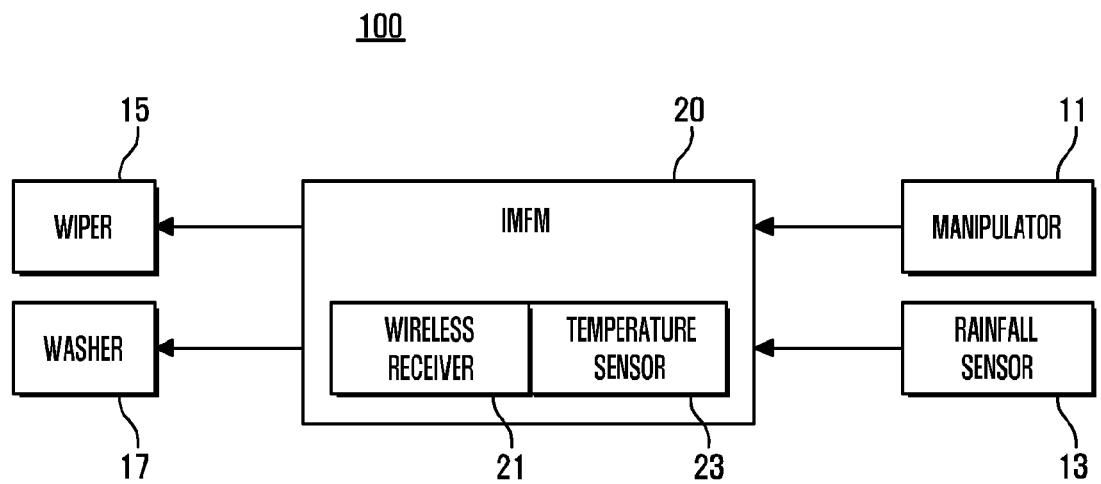
FIG. 1 is a block diagram illustrating an exemplary apparatus to control a wiper and washer.
FIG. 2 is a diagram illustrating a view for describing an operation in an intelligent multi-function mode according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In the description below, a reference temperature may denote a predetermined temperature value capable of controlling the drive of a washer lest the washer fluid is ejected and frozen.

FIG. 1 illustrates an exemplary apparatus 100 to control a wiper and washer.

Referring to FIG. 1, the apparatus 100 includes a manipulator 11, a rainfall sensor 13, a wiper 15, a washer 17, and an intelligent multi-function module (IMFM) 20.

The manipulator 11 may include manipulation buttons capable of operating the wiper 15 and the washer 17. Moreover, the manipulator 11 may include a button enabling a user/driver to select an intelligent multi-function mode. The manipulator 11 may further include a function button enabling the selection of any one of a service mode and a driver mode of the intelligent multifunction mode. For example, to simplify the structure and the number of buttons, the execution of the service mode and the driver mode may be made by differently applying button-push times for requiring the execution of the intelligent multifunction mode.

The rainfall sensor 13 senses rainfall.

The wiper 15 wipes a front windshield a vehicle according to a control of the IMFM 20. Moreover, the wiper 15 may wipe the front windshield using the ejected washer fluid.

The washer 17 ejects the washer fluid to the front windshield of the vehicle according to the control of the IMFM 20.

The IMFM 20 controls the overall operations of the wiper 15 and the washer 17. When rainfall is sensed by the rainfall sensor 13, the IMFM 20 may drive the wiper 15. The IMFM 20 may include a switch (not shown) to control a motor (not shown) of a unit corresponding to a function of the vehicle, a wireless receiver 21 to receive wireless control signals for the wiper 15 and the washer 17, and a temperature sensor 23 to sense the temperature of the vehicle.

For example, when the rainfall sensor 13 senses rainfall, the IMFM 20 determines whether a temperature sensing function of the vehicle is operated according to the intelligent multi-function mode selected by a user/driver and controls each of the wiper 15 and the washer 17 according to the result of the determination. In the service mode of the intelligent multi-function mode, the IMFM 20 controls the drive of the washer 17 in view of a temperature of the vehicle sensed by the temperature sensor 23. At this point, when the sensed temperature of the vehicle is less than a reference temperature, the IMFM 20 controls the washer 17 so as not to eject the washer fluid. On the other hand, when the sensed temperature of the vehicle is more than the reference temperature, the IMFM 17 controls the washer to eject the washer fluid. The reference temperature may be varied and set according to a requirement of the user/driver. This is to reflect the requirement of the user/driver to the utmost to control the wiper 15 and the washer 17. Even in a state where an ignition key is stripped through the wireless receiver 21, when a requirement signal is wirelessly received to go into the intelligent multi-function mode, the IMFM 20 may control the performance of the intelligent multi-function mode.

FIG. 2 is a view which illustrates an operation in an intelligent multi-function mode according to an exemplary embodiment.

Referring to FIG. 2, the intelligent multi-function mode may be remotely controlled in a wireless fashion by a remote controller, and may be controlled by the manipulation of buttons included in the vehicle. While a method of remotely controlling with the remote controller uses a "wireless fashion" and a method of controlling through the manipulation of the buttons uses a "wire fashion," the two methods identically controls the operations of the intelligent multi-function mode.

The intelligent multi-function mode includes the service mode to control the drive of the wiper 15 and the washer 17 according to the temperature of the vehicle, and the driver mode to control the drive of the wiper 15 and the washer 17 according to a requirement of the user/driver.

In the service mode, in response to a condition where the wiper 15 and the washer 17 may need to be driven (e.g. when rainfall is sensed), the IMFM 20 compares a temperature of the vehicle sensed by the temperature sensor 23 with the reference temperature, and controls the wiper 15 and the washer 17 according to the result of the comparison.

When the comparison result shows that the temperature of the vehicle is equal to or more than the reference temperature, the IMFM 20 drives the wiper 15 and the washer 17.

When the comparison result shows that the temperature of the vehicle is less than the reference temperature, the IMFM 20 drives the wiper 15 whereas does not drive the washer 17. This is to prevent the freezing of the washer fluid ejected by the washer 17 in a case where the wiper 15 and the washer 17 operate in cold weather.

In the driver mode, the wiper 15 and the washer 17 may be controlled according to a requirement of the user/driver regardless of the temperature of the vehicle.

Figure 3:
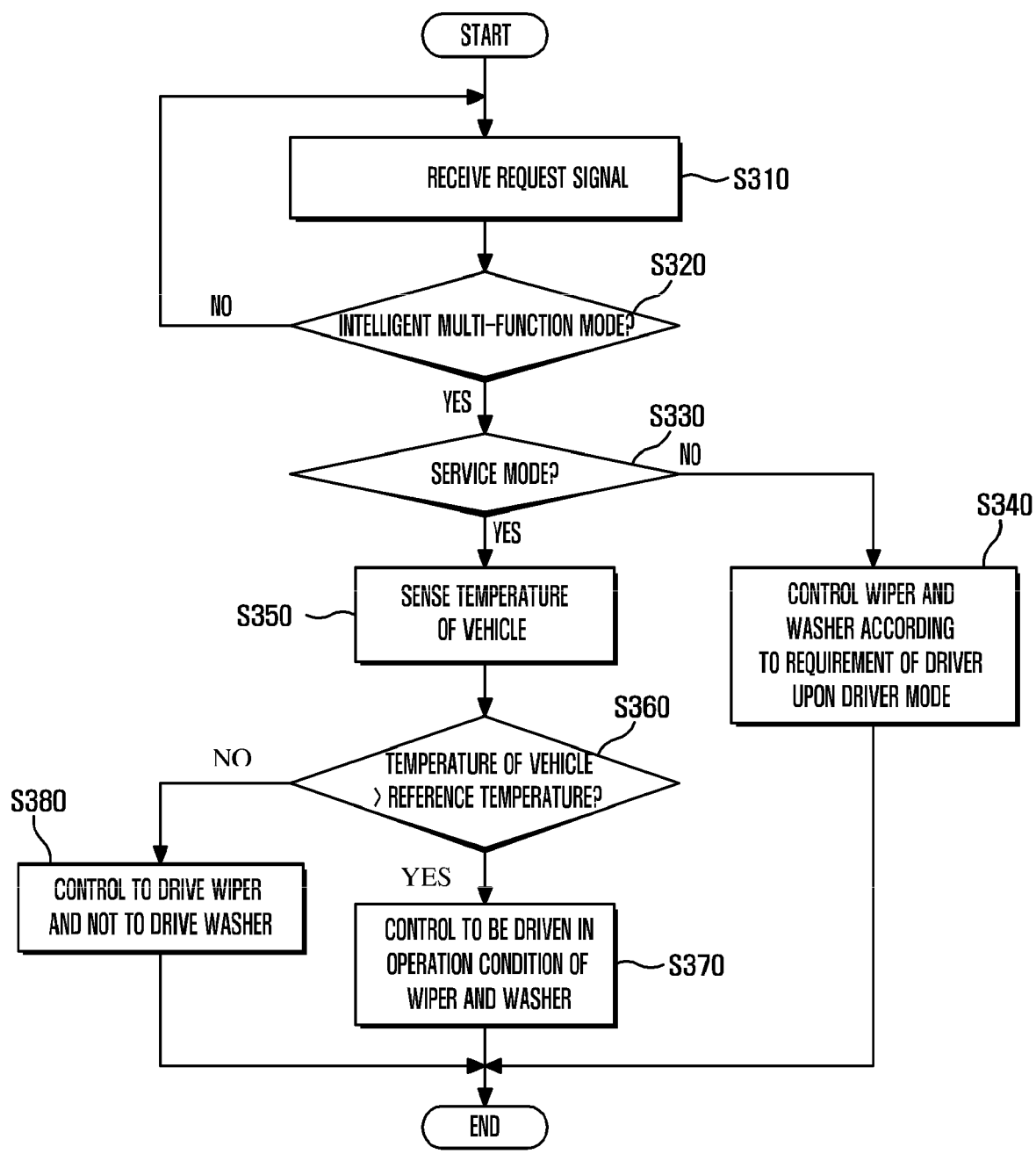
FIG. 3 is a flowchart illustrating an exemplary method for controlling a wiper and washer.

FIG. 3 illustrates an exemplary method for controlling a wiper and washer.

Referring to FIG. 3, the IMFM 20 receives a request signal to control the vehicle from the user/driver in operation S310.

The IMFM 20 determines whether the received request signal is a signal requesting the execution of the intelligent multi-function mode in operation S320.

When the determination result shows that a mode is the intelligent multi-function mode, the IMFM 20 determines whether a mode is the service mode in operation S330. When the mode is not the service mode, the driver mode is performed in operation S340.

That is, when the mode is not the service mode, the IMFM 20 executes the driver mode to control the wiper 15 and the washer 17 according to a requirement of the user/driver in the operation S340.

However, when the mode is the service mode, the IMFM 20 drives the temperature sensor 23 to sense the temperature of the vehicle in operation S350.

The IMFM 20 compares the sensed temperature of the vehicle with the reference temperature in operation S360.

When the comparison result shows that the sensed temperature of the vehicle is more than the reference temperature, the IMFM 20 drives the wiper 15 and the washer 17.

When the comparison result shows that the sensed temperature of the vehicle is less than the reference temperature, the IMFM 20 drives the wiper 15 whereas does not drive the washer 17.

According to examples described above, a wiper and a washer may be controlled in view of the external environment in a service mode of an intelligent multi-function mode, which may be set as a default in the intelligent multi-function mode, and may be controlled according to a requirement of a user/driver in a driver mode of the intelligent multi-function mode.

The external environment may include a temperature factor such that where a temperature sensed by a vehicle is less than a reference temperature, only the wiper may be operated and not the washer, so as to prevent the washer fluid from being released and causing icing of a windshield in cold weather. This may prevent the failure of a wiper driving motor caused by obstructing the drive of the wiper due to the freezing of the washer fluid.

The drive of the wiper and the washer may be controlled in a wireless fashion in a state where a start key is stripped. Accordingly, a user/driver need not always start and manipulate the vehicle to control the drive of the wiper and the washer. And the user/drive may secure a view through the windshield by wiping the windshield of the vehicle before the vehicle is started and/or driven.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling wiper and washer, comprising:
   a wiper wiping a windshield of a vehicle;
   a washer ejecting washer fluid to the windshield of the vehicle; and
   an Intelligent Multi-Function Module (IMFM) determining whether a temperature sensing function of the vehicle is operated according to a selected intelligent multi-function mode, and controlling the wiper and the washer according to a sensed temperature of the vehicle,
   wherein the IMFM comprises:
   a wireless receiver receiving a wireless control signal for the wiper and the washer; and
   a temperature sensor sensing the temperature of the vehicle.

2. The apparatus of claim 1, wherein the IMFM controls a drive of the washer in view of the sensed temperature of the vehicle upon a service mode of the intelligent multi-function mode.

3. The apparatus of claim 1 or claim 2, wherein the IMFM controls the washer not to eject washer fluid when the sensed temperature of the vehicle is less than a reference temperature, and controls the washer to eject the washer fluid when the sensed temperature of the vehicle is more than the reference temperature, upon a service mode of the intelligent multi-function mode.

4. The apparatus of claim 3, wherein the reference temperature is a predetermined temperature value for controlling a drive of the washer lest the washer fluid is ejected and frozen.

5. An apparatus for controlling wiper and washer, comprising:
   a wiper wiping a windshield of a vehicle;
   a washer ejecting washer fluid to the windshield of the vehicle; and
   an Intelligent Multi-Function Module (IMFM) determining whether a temperature sensing function of the vehicle is operated according to a selected intelligent multi-function mode, and controlling the wiper and the washer according to a sensed temperature of the vehicle,
   wherein the IMFM controls the washer not to eject washer fluid when the sensed temperature of the vehicle is less than a reference temperature, and controls the washer to eject the washer fluid when the sensed temperature of the vehicle is more than the reference temperature, upon a service mode of the intelligent multi-function mode, and the reference temperature can be changed into a desired temperature intended to be set by a driver.

6. The apparatus of claim 1, wherein an execution request for the intelligent multi-function mode is performed in a wireless fashion or in a wire fashion.

7. The apparatus of claim 1, wherein the IMFM controls the wiper and the washer according to the temperature of the vehicle upon a service mode of the intelligent multi-function mode, and controls the wiper and the washer according to a requirement of a driver upon a driver mode of the intelligent multi-function mode.

* * * * *